Patented Sept. 15, 1942

2,295,605

UNITED STATES PATENT OFFICE 2,295,605

SULPHURIC ACID MANUFACTURE

Earl S. Ridler, Wilmington, Del., assignor to E. I. du Pont de Nemours & Company, Wilmington, Del., a corporation of Delaware No Drawing. Application October 24, 1939, Serial No. 300,943

3 Claims. (Cl. 23—174)

This invention relates to the manufacture of sulphuric acid by the contact process and is more particularly directed to processes wherein sulphur containing more than about 0.01 per cent ash is filtered to reduce the ash to below about 0.0005 per cent, then burning the sulphur and then without intermediate purification catalytically converting the resulting sulphur dioxide to sulphur trioxide.

Very pure sulphur such as sublimed sulphur or extremely pure natural deposits can be burned to produce a sulphur dioxide gas relatively free from dust and suspended matter. Such a gas can be passed directly to a catalytic converter for the production of sulphur trioxide.

Unfortunately, pure sulphur is neither cheap enough nor abundant enough to permit its use in the commercial manufacture of sulphuric acid and the sulphur which is available produces, upon burning, a sulphur dioxide gas which contains considerable amounts of dust. These customary supplies of sulphur are sometimes settled to remove large particles and pieces of foreign material but the sulphur normally contains in excess of about 0.01 per cent ash.

It has heretofore been essential to remove dust from sulphur dioxide gases and this has customarily been done by washing the gases with weak acid. It has also been proposed to filter the hot sulphur dioxide gases to remove non-combustible materials suspended therein but filters for handling these gases at high temperature are difficult and costly to operate and maintain.

It is an object of the present invention to provide processes which will permit the use of relatively poor grades of sulphur and the usually available commercial sulphur having more than about 0.01 per cent ash.

It is a further object of this invention to provide practical commercial processes which do not require a dust removal treatment of sulphur dioxide gases between a sulphur burner and a contact converter.

It is a still further object of this invention to provide processes which, though providing no means for removing dust, may nevertheless use a spray-type burner wherein sulphur is sprayed directly into the gas stream.

It is a still further object of this invention to provide a simple and economical process involving a minimum of equipment. Still further objects will become apparent hereinafter.

The foregoing and other objects of this invention are accomplished by filtering sulphur which contains more than about 0.01 per cent ash to reduce the ash to less than about 0.0005 per cent, or, preferably, to less than about 0.0003 per cent, then burning the sulphur, and then without intermediate purification converting the resulting sulphur dioxide to sulphur trioxide. The crude sulphur of commerce which is used according to the present invention contains in excess of about 0.01 per cent ash and as a usual thing does not contain more than about 0.06 per cent ash. While this content of non-combustible material appears small, it has been found that when using a spray-type burner this ash is carried over with the sulphur dioxide gases as dust and it is essential that the gases be purified before passing them into a catalytic converter.

According to the present invention the crude sulphur is filtered to reduce the ash to at least about 0.0005 per cent. As a usual thing the ash will finally be between about 0.0001 and 0.0003 per cent. The filter may be of any suitable type for handling molten sulphur and it has been found satisfactory to use porous carbon or porous aloxite filtering elements. It is preferred that the filter elements have a porosity no greater than 5, that is, the size and number of the openings in the filter are such that five cubic feet of air per minute will pass through one square foot of the filtering medium one inch thick under a pressure differential equal to two inches of water. While it is preferred as indicated to use a filter, it will be understood that there may be used any mechanical means such as centrifuging which will reduce the ash to the extent indicated.

After the content of non-combustible material in the sulphur has been reduced to about 0.0005 per cent, or preferably 0.0003 per cent, the sulphur is then burned to sulphur dioxide. The sulphur is preferably burned with a spray-type burner wherein the molten sulphur is sprayed directly into a stream of air in which it burns. As a practical matter, it will be found most expedient to run the molten sulphur directly from the filtering operation to the burner without allowing its temperature to drop below the solidification point.

The sulphur dioxide produced by burning the sulphur of low ash content is then led directly into a contact converter without intermediate purification. It will be understood that while no purification is effected and while this is one of the principal advantages of the processes of this invention, the gases may be passed through heat exchange devices to effect heat economies in various of the methods heretofore proposed. It may even in some instances be found desirable in old installations to leave filters or dust traps since these will be found to collect some slight amount of dust.

The catalytic converter used in the processes of the present invention may be of any of the types heretofore known and used by the art. The invention is particularly applicable and advantageous with platinum catalysts supported on a silica or magnesium sulphate mass, but it will be understood that vanadium catalysts may alternatively be used.

While I have described certain specific illustrative processes and conditions above, it will be understood that one skilled in the art may without departing from the spirit of this invention readily devise numerous processes for the manufacture of sulphuric acid and involving the reduction of ash content of crude sulphur from more than 0.01 per cent to no more than about 0.0005 per cent, the burning of this sulphur and the conversion of the resulting sulphur dioxide gases without intermediate removal of dust.

I claim:

1. In a process for the manufacture of sulphuric acid from sulphur containing more than about 0.01 per cent non-combustible material, the steps comprising filtering the sulphur with a filter element of material selected from the group consisting of carbon and aloxite, the filter element having a porosity such that five cubic feet of air per minute will pass through one square foot of the filtering medium one inch thick under a pressure differential equal to two inches of water, the filtering operations reducing the non-combustible material to no more than about 0.0003 per cent, leading the molten sulphur without permitting it to solidify to a spray-type burner, burning the sulphur in a stream of air and then passing the stream directly to a converter, and catalytically converting the sulphur dioxide resulting from burning the sulphur to sulphur trioxide.

2. In a process for the manufacture of sulphuric acid from sulphur containing more than about 0.01 per cent non-combustible material, the steps comprising filtering the sulphur to reduce its non-combustible material content to no more than about 0.0005 per cent, burning the sulphur and then without intermediate removal of dust converting the sulphur dioxide to sulphur trioxide.

3. In a process for the manufacture of sulphuric acid from sulphur containing more than about 0.01 per cent non-combustible material, the steps comprising filtering the sulphur with a filter element having a porosity such that no more than five cubic feet of air per minute will pass thru one square foot of the filtering medium one inch thick under a pressure differential equal to two inches of water, the filtering operations reducing the non-combustible material to no more than about 0.0005 per cent, leading the molten sulphur without permitting it to solidify to a spray-type burner, burning the sulphur in a stream of air and then passing the stream directly to a converter, and catalytically converting the sulphur dioxide resulting from burning the sulphur to sulphur trioxide.

EARL S. RIDLER.